(12) United States Patent
Burkhart et al.

(10) Patent No.: US 8,725,639 B1
(45) Date of Patent: May 13, 2014

(54) COUPLING PREPAID DEBIT CARDS TO ONLINE STORED-VALUE ACCOUNTS

(75) Inventors: Kevin T. Burkhart, Seattle, WA (US); Alexander L. Rouse, Seattle, WA (US); Ajay Bhutani, Bangalore (IN); Stephen A. Jasper, Seattle, WA (US); Mary Katherine Bowman, Seattle, WA (US); Matthew W. Hall, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 311 days.

(21) Appl. No.: 13/164,206

(22) Filed: Jun. 20, 2011

(51) Int. Cl.
*G06Q 40/00* (2012.01)
*G06F 17/00* (2006.01)
*G06Q 40/02* (2012.01)
*G06Q 20/40* (2012.01)
*G06Q 30/02* (2012.01)

(52) U.S. Cl.
CPC .............. *G06F 17/60* (2013.01); *G06Q 40/02* (2013.01); *G06Q 20/40* (2013.01); *G06Q 30/0269* (2013.01)
USPC .............. 705/41; 705/40; 705/39; 705/14.17; 705/26.1; 705/1.1

(58) Field of Classification Search
CPC ....................................................... G06F 17/60
USPC .............. 705/1.1, 41, 40, 39, 14.17, 26.1, 64; 235/380, 379, 383
See application file for complete search history.

(56) References Cited

U.S. PATENT DOCUMENTS

| | | | | |
|---|---|---|---|---|
| 6,105,008 A | * | 8/2000 | Davis et al. ..................... | 705/41 |
| 2002/0026418 A1 | * | 2/2002 | Koppel et al. .................. | 705/41 |
| 2006/0064372 A1 | * | 3/2006 | Gupta ............................ | 705/39 |

* cited by examiner

*Primary Examiner* — John H Holly
(74) *Attorney, Agent, or Firm* — Hope Baldauff, LLC

(57) ABSTRACT

Technologies are described herein for making the value in an online-stored value account accessible through a prepaid debit card. A payment services provider may offer general-purpose reloadable ("GPR") cards to customers that are co-managed by the payment services provider and a traditional prepaid program manager. An integration is implemented between the payment services provider system hosting the online stored-value account and the program manager system such that the balance of the funds maintained for the online stored-value account may be used for purchases made using the GPR card.

22 Claims, 6 Drawing Sheets

COUPLING PREPAID DEBIT CARDS TO ONLINE STORED-VALUE ACCOUNTS

BACKGROUND

Open-loop prepaid debit cards are a fast growing segment of the financial services industry. Also referred to as prepaid credit cards or general-purpose reloadable ("GPR") cards, a cardholder of a GPR card spends money which has been "pre-loaded" on the card. For example, the cardholder may purchase the GPR card in a retail outlet, such as a grocery store, convenience store, or department store, and load the card with value using cash or another payment method at the time of checkout. Unlike store gift cards, however, the GPR card may be used in a variety of retail locations based on the payment network associated with the card. The payment network may define the rules that determine where the GPR card may be used, how the transactions are processed, and what entities are involved in the processing of the transactions.

The value of the GPR card is not physically stored on the card itself. Instead the card number may uniquely identify a record in a centralized database of a program manager where the balance of the card is recorded. The program manager, may further provide the retail outlets with the physical GPR cards for sale, process payment transactions from the payment network(s) for the cards, handle settlement and other aspects of the relationship with the issuing bank, as well as provide services to the cardholder of the cards, such as a Web portal for management of the card or re-loading of the card's value.

Online stored-value accounts may be offered by payment services providers. Online stored-value accounts may provide online shoppers with a convenient and centralized location for maintaining a stored value, which can be used as a source of payment for goods and services purchased online. Online payment services providers may also provide merchants with an easy-to-implement method of accepting online payments as well as associated services such as an online shopping cart and/or a standard and familiar checkout process, without the merchants having to be concerned with the complexities of processing credit card, debit card, and GPR card payments, privacy concerns, bank settlements, and the like. Unlike GPR cards, however, the processing of payment transactions are handled by the payment services provider instead of a payment network, and as such may be "closed-loop," i.e. only available for payment to online merchants that are integrated with or subscribe to the payment services of the payment services provider.

It is with respect to these and other considerations that the disclosure made herein is presented.

DETAILED DESCRIPTION

Figure 1A:
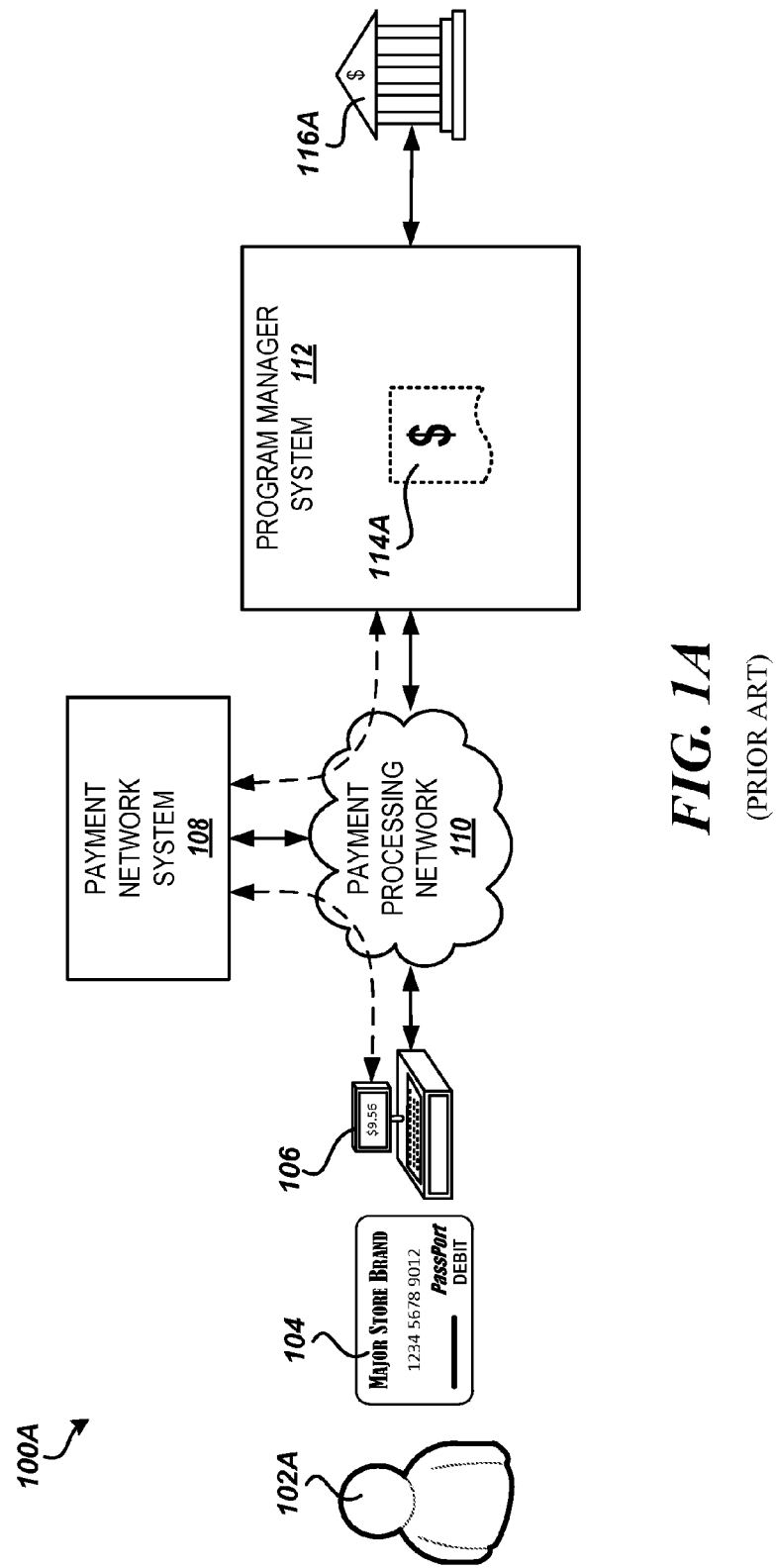
FIGS. 1A and 1B are system diagrams showing aspects of current operating environments for processing prepaid debit card transactions and processing online payments made from an online stored-value account.

The following detailed description is directed to technologies for making the value in an online-stored value account accessible through a prepaid debit card. Utilizing the technologies described herein, a payment services provider may offer a general-purpose reloadable ("GPR") card to a customer that is co-managed by the payment services provider and a traditional prepaid program manager. The GPR card may be tied to the balance of an online stored-value account for the customer provided by the payment services provider. This benefits the customer by providing all the existing services of the online stored-value account for payment for products and services from merchants in the payment services provider's network, as well as allowing the funds maintained in the online stored-value account to be utilized through the GPR card for payment at other online merchants or at brick-and-mortar retail locations. In addition, many other types of services offered by the online stored-value account, such as daily and transaction spending limits, authorizations, and notifications, may be applied to purchases made through the GPR card. Moreover, the additional utility of the stored-value accounts provided by the linked GPR cards may allow the payment services provider to build stored value.

The payment services provider and/or program manager may make co-branded GPR cards available for purchase online or in a variety of retail outlets, such as grocery stores, drug stores, convenience stores, and the like. A new customer purchasing a GPR card at a retail outlet may load the card with funds at the time of sale, and then subsequently go online with the payment services provider to "activate" the card. During the activation process, the payment services provider can collect the information required to establish a new online stored-value account for the customer, with the funds loaded to the card as the initial balance in the stored-value account. Once activated, the payment services provider or program manager may further send a personalized GPR card to the customer.

A new customer purchasing a GPR card online may be directed to a website provided by the payment services provider, where the new customer enters all the information necessary both to receive the GPR card and establish a new online stored-value account with the payment services provider. The customer may then specify a funding source, such as a checking account, that will be utilized to initially load value to the online stored-value account and linked GPR card, after which the payment services provider or program manager may mail a personalized card to the customer. Additionally or alternatively, existing customers of the payment services provider may be able to order GPR cards that are tied to the stored-value in their account and have the card sent to them through the mail. Once the customer has been issued a GPR card tied to the balance in his or her online stored-value account, the payment services provider and/or program manager may process transactions from the GPR card and/or maintain the balance in the online stored-value account accordingly.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1A is a system diagram showing an illustrative operating environment 100A supporting the processing of payment transactions associated with traditional GPR cards. The environment 100A includes a customer 102A with a prepaid debit or GPR card 104. The GPR card 104 may be issued by a bank 116A, and may be managed by a GPR card program manager. The program manager may operate a program manager system 112 that maintains a tracking balance 114A for the GPR card 104 that may be utilized by the customer 102A to make purchases at both online and brick-and-mortar retail outlets. In addition, the GPR card 104 may be associated with a particular payment network and corresponding payment network system 108.

When the customer 102A utilizes the GPR card 104 to make a purchase, such as by swiping the card at a retail point-of-sale ("POS") terminal 106, for example, the POS terminal may contact the payment network system 108 through a payment processing network 110 for authorization of the purchase. The payment processing network 110 may be a combination of a variety of networks with various topologies, including local area networks ("LANs"), wide-area networks ("WANs"), the Internet, or other networking topologies known in the art that connect the POS terminal 106 to the payment network system 108. The payment network system 108 may subsequently forward the authorization request to the program manager system 112 responsible for the GPR card 104 over the payment processing network 110.

Upon receiving the authorization request, the program manager system 112 may check the tracking balance 114A associated with the GPR card 104 in order to determine if sufficient funds exist for the customer 102A to complete the purchase. The program manager system 112 may then send an authorization of the transaction to the payment network system 108 back across the payment processing network 110, which the payment network system forwards to the POS terminal 106. Similarly, once the transaction is completed, the POS terminal 106 may inform the payment network system 108, which forwards the completed transaction to the program manager system 112. The program manager system 112 may then update the tracking balance 114A maintained in the system for GPR card 104 accordingly.

At a later time the program manager system 112, in conjunction with the payment network system 108, may perform settlement processing of outstanding transactions with the bank 116A. It will be appreciated that other processing systems and networks may exist in the environment 100A beyond those shown in FIG. 1A. For example a merchant acquirer system may exist between the POS terminal 106 and the payment network system 108. Similarly, a processor acquirer system and/or network may exist between the payment network system 108 and the program manager system 112. It will be further appreciated that, while the GPR card is described herein and shown in the figures as a "card," the GPR card 104 may represent any payment token issued by the bank 116A and/or managed by the program manager, such as a barcode tag, a radio-frequency ID ("RFID") key fob, a near-field communication ("NFC") chip in a mobile device, and the like.

Figure 1B:
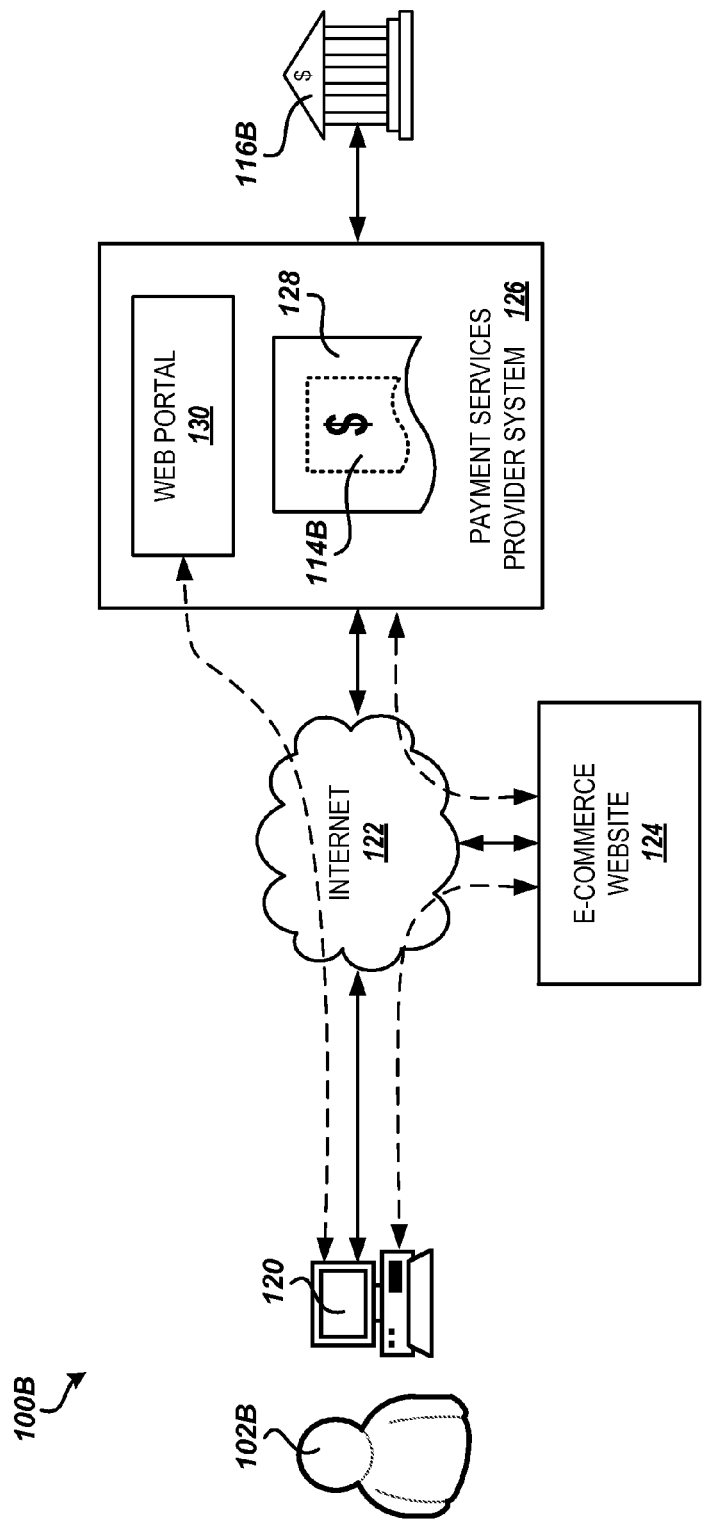

FIG. 1B shows an illustrative operating environment 100B for processing payment transactions associated with an online stored-value account. The environment 100B includes a customer 102B with an online stored-value account 128 provided by a payment services provider. The payment services provider may operate a payment services provider system 126 that provides the customer 102B with the transaction and management services associated with the online stored-value account 128. In addition, the payment services provider system 126 may maintain a tracking balance 114B associated with the online stored-value account 128 representing funds that the customer 102B may utilize for purchases from online merchants in the online service provider's "network," i.e. online merchants that are integrated with or subscribe to the services provided by the payment services provider. The tracking balance 114B of the stored value account 128 may represent money, points, minutes, miles, or any other balance of "funds" that may be redeemed for purchased items.

For example, the customer 102B may utilize a computing device 120, such as a personal computer ("PC"), a laptop, a desktop, a personal digital assistant ("PDA"), mobile phone, e-book reader, set-top box, game console, and the like, to access an e-commerce website 124 provided by an online merchant in the payment services provider's network over the Internet 122. The customer 102B may utilize the e-commerce website 124 to select and purchase goods or services offered by the online merchant. Upon checkout, the customer 102B may specify the online stored-value account 128 maintained at the payment services provider system 126 as the source of funds for purchase of the goods or services. The e-commerce website 124 may then contact the payment services provider system 126 for authorization of the payment transaction.

Upon receiving the authorization request, the payment services provider system 126 may check the tracking balance 114B associated with the online stored-value account 128 for the customer 102B in order to determine if sufficient funds exist for the customer to complete the purchase. The payment services provider system 126 may then send an authorization of the transaction back to the e-commerce website 124 to complete the transaction In addition, the payment services provider system 126 may update the tracking balance 114B associated with the online stored-value account 128 accordingly.

The payment services provider system 126 may also perform settlement processing with a bank 116B or third-party funds provider associated with the online stored-value account 128 maintained by the payment services provider. In addition to processing purchase transactions from e-commerce websites 124 in the payment services provider's network, the payment services provider system 126 may further provide services to the customer 102B for managing the online stored-value account 128, including a Web portal 130 allowing the customer to view the tracking balance 114B associated with the account, add additional funds to the account, setup scheduled deposits of funds to the account, update personal and contact information, set spending limits, such as daily limits or per-transaction limits, authorize use of the online stored-value account for purchases from specific e-commerce websites 124 or for specific goods or services only, setup notifications of activity in the account, view activity history, and the like.

Figure 2:
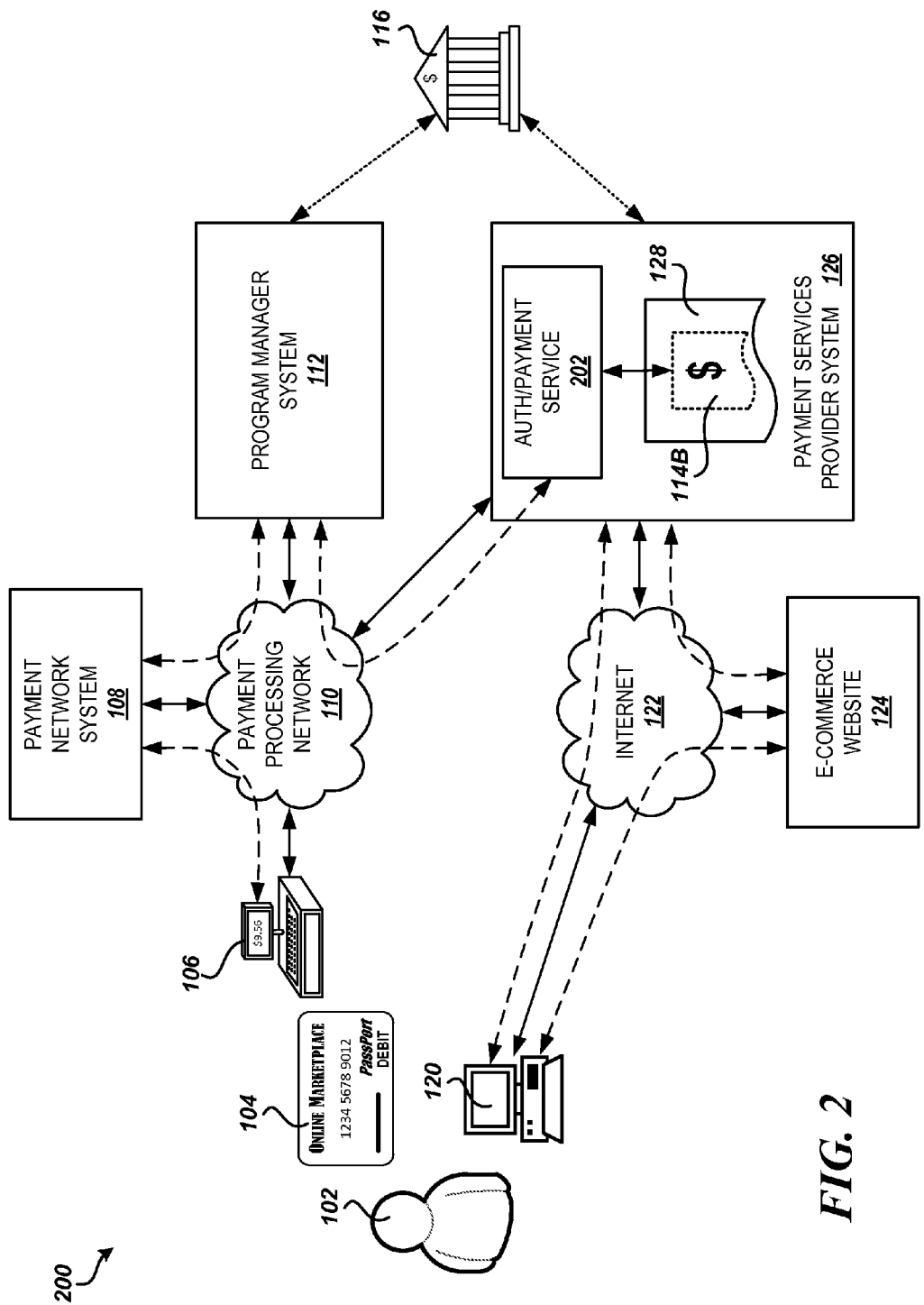
FIGS. 2 and 3 are system diagrams showing aspects of illustrative operating environments for making the value in an online-stored value account accessible through a prepaid debit card, including several software and hardware components provided by embodiments presented herein.

FIG. 2 shows an illustrative operating environment 200 including several software components for making the value in an online-stored value account accessible through a prepaid debit card. According to embodiments, the customer 102 shown in FIG. 2 has both an online stored-value account 128 provided by a payment services provider and a GPR card 104 co-managed by the payment services provider and a program manager. The co-managed GPR card 104 is tied to the tracking balance 114B associated with the online stored-value account 128 maintained by the payment services provider system 126, such that the value in the stored-value account may be utilized to make purchases from both online merchants in the payment services provider's network as well as other online and brick-and-mortar merchants.

The payments services provider system 126 may process payment transactions made to e-commerce websites 124 in the payment services provider's network, as described above in regard to FIG. 1B. In addition, the payment services provider system 126 provides an authorization/payment service 202 connected to the payment processing network 110 to process purchase transactions made by the customer 102 with the co-managed GPR card 104. For example, when the customer 102 utilizes the co-managed GPR card 104 to make a purchase at a POS terminal 106, the POS terminal makes a request through the payment processing network 110 for authorization for the purchase from the payment network system 108. The payment network system 108 forwards the authorization request to the program manager system 112, and the program manager system subsequently forwards the request for authorization to the authorization/payment service 202 implemented by the payment services provider system 126.

Upon receiving the authorization request, the authorization/payment service 202 checks the tracking balance 114B associated with the online stored-value account 128 to determine if sufficient funds exist for the customer 102 to complete the purchase. According to one embodiment, the authorization/payment service 202 may further check daily and/or per-transaction spending limits and other limits or authorizations established for the online stored-value account 128, as discussed above. The authorization/payment service 202 may then send an authorization of the transaction to the program manager system 112 over the payment processing network 110, which forwards the authorization to the payment network system 108 and finally back to the POS terminal 106.

Similarly, once the transaction is completed, the POS terminal 106 may inform the payment network system 108, which forwards the completed transaction to the program manager system 112 and then to the authorization/payment service 202 on the payment services provider system 126. The authorization/payment service 202 may then update the tracking balance 114B associated with the online stored-value account 128 to reflect the amount of the completed transaction. At a later time the program manager system 112 and/or the payment services provider system 126 may perform settlement processing of outstanding transactions with the bank 116.

Figure 3:
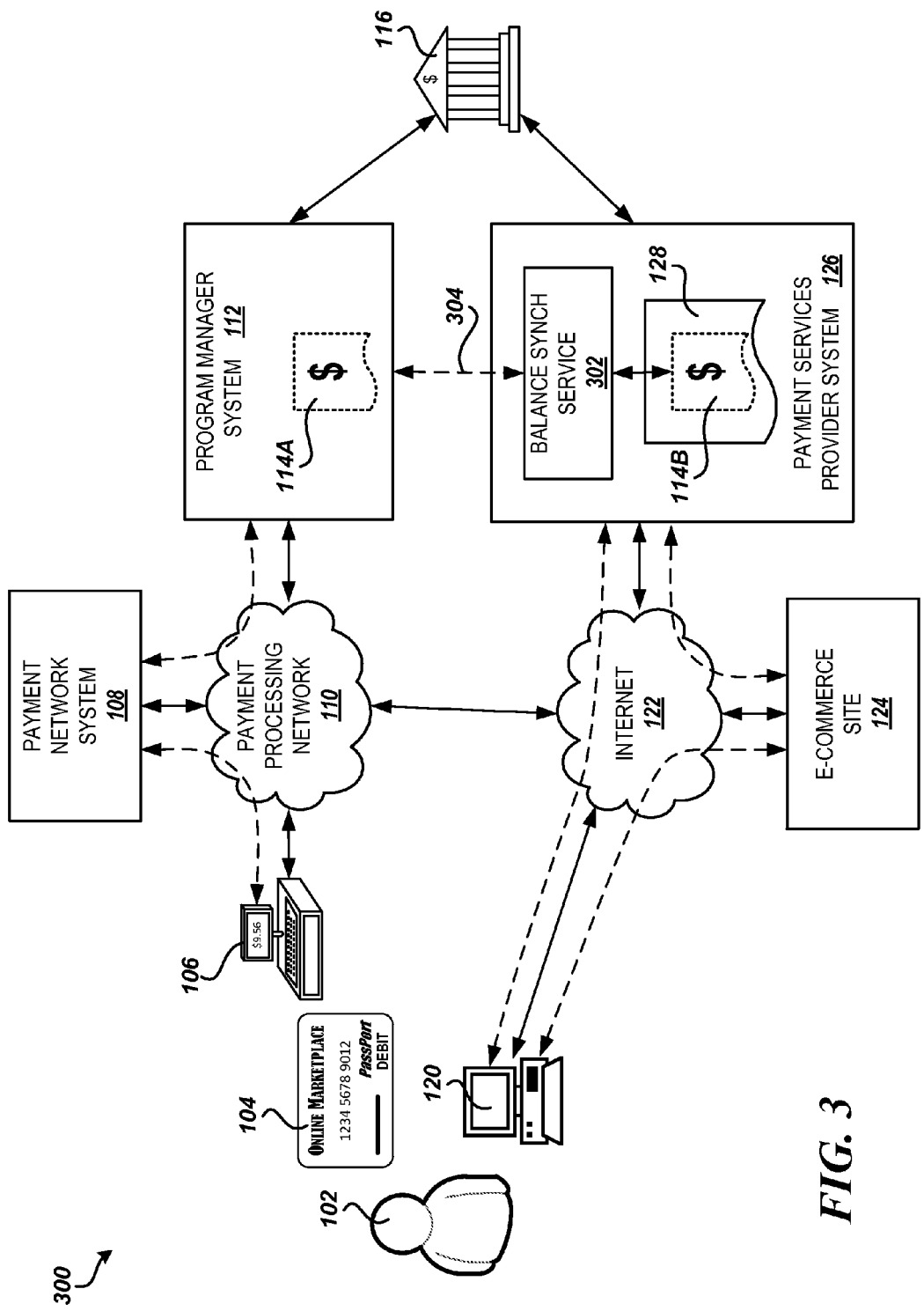

FIG. 3 illustrates another embodiment for making the value in an online-stored value account accessible through a prepaid debit card. According to the embodiment, the payment services provider system 126 implements a balance synchronization service 302 which integrates with the program manager system 112 to ensure that the tracking balance 114A associated with the co-managed GPR card 104 maintained by the program manager system 112 and the tracking balance 114B associated with the online stored-value account 128 maintained by the payment services provider system remains synchronized. The balance synchronization service 302 may perform the synchronization on a timed basis or in response to transaction processing occurring in either system. The balance synchronization service 302 may utilize a link 304 established between payment services provider system 126 and the program manager system 112 to perform the synchronization of the tracking balances 114A and 114B. The link 304 may utilize the payment processing network 110, the Internet 122, and/or other networks that connect the respective services.

It will be appreciated that other methods and/or links known in the art may be implemented between the program manager system 112 and the payment services provider system 126 in order to maintain synchronization of the tracking balance 114A associated with the co-managed GPR card 104 and the tracking balance 114B associated with the online stored-value account 128, respectively. With the tracking balances 114A and 114B synchronized, the program manager system 112 may process authorization/payment transactions regarding the co-managed GPR card 104 as described above in regard to FIG. 1A, while the payment services provider system 126 processes payments made at e-commerce websites 124 within the payment services provider's network in the same manner as described above in regard to FIG. 1B.

The roles and responsibilities of the program manager and the payment services provider in regard to the co-managed GPR card 104 may vary based on the agreements established between the two. As such, the functions and processes of the corresponding program manager system 112 and payment services provider system 126 may be different than those described herein and shown in the figures. According to one embodiment, the payment services provider provides the Web portal 130 for creation and management of the online stored-value account 128 and activation of the linked GPR card 104, maintains the tracking balance 114B associated with the account, and provides the means to add additional funds to the account. The program manager implements and maintains the integration with the payment network system(s) 108, performs settlement processing with the bank 116 for all transactions made through the payment network(s), and manages inventory and distribution of the physical GPR cards 104 to customers 102.

It will be appreciated that other divisions of roles and responsibilities between the program manager and the payment services provider in regard to the co-managed GPR cards 104 may be imagined, and it is intended that all such divisions of roles and responsibilities be included in this application. According to another embodiment, purchases made by the customer 102 using the co-managed GPR card 104 at e-commerce websites 124 within the payment services provider's network may be processed entirely within the payment services provider system 126 and settled with the bank 116 directly, thus eliminating processing fees and other costs associated with processing the transaction through the payment network, the program manager, and/or other systems and services on the payment processing network 110.

Figure 4:
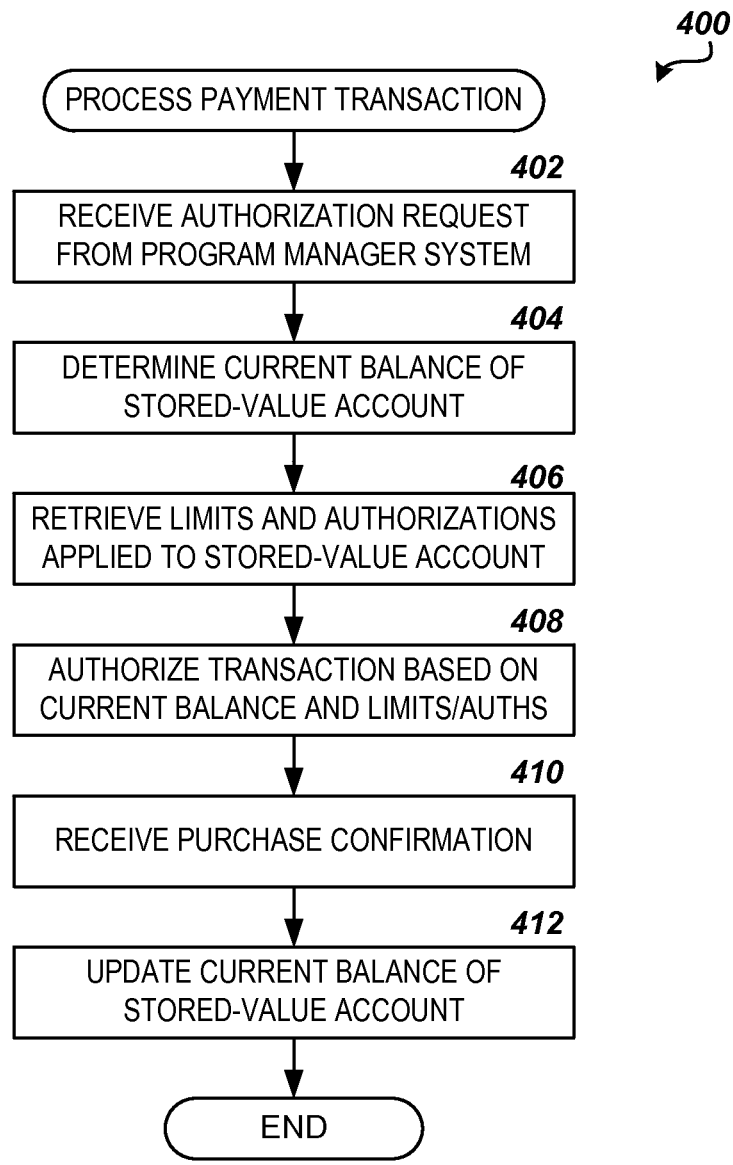
FIG. 4 is a flow diagram for processing authorization/payment transactions for a co-managed GPR card against the value in an online stored-value account, according to embodiments described herein.

Turning now to FIG. 4, additional details will be provided regarding the embodiments described herein for making the value in an online-stored value account accessible through a prepaid debit card. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates a routine 400 for processing authorization/payment transactions for the co-managed GPR card 104 against the tracking balance 114B associated with an online stored-value account 128, according to one embodiment described herein. The routine 400 may be performed by the authorization/payment service 202 implemented by the payment services provider system 126, as described above in regard to FIG. 2. It will be appreciated that the routine 400 may also be performed by other modules or components of the payment services provider system 126 or by any other combination of modules and components.

The routine 400 begins at operation 402, where the authorization/payment service 202 receives an authorization request from program manager system 112 corresponding to a use of the co-managed GPR card 104. As described above in regard to FIG. 2, when a customer 102 utilizes the co-managed GPR card 104 to make a purchase at a retail location or through an online merchant, the merchant system makes a request through the payment processing network 110 for authorization for the purchase from the payment network system 108 of the payment network associated with the GPR card. The payment network system 108 then forwards the authorization request to the program manager system 112, which subsequently forwards the request for authorization to the authorization/payment service 202 implemented by the payment services provider system 126. The authorization request may contain information regarding the prospective purchase, including the identity of the retail or online merchant, the amount of the purchase, the type of goods being purchased, and the like.

From operation 402, the routine 400 proceeds to operation 404, where the authorization/payment service 202 determines the tracking balance 114B associated with the online stored-value account 128 in order to determine if sufficient funds are reflected in the balance to authorize the transaction. According to one embodiment, in addition to the tracking balance 114B, the authorization/payment service 202 may further retrieve limits, authorizations, and settings established for the online stored-value account 128 in order to determine whether to authorize the transaction, as shown at operation 406. For example, the authorization/payment service 202 may utilize the information in the authorization request to determine whether the transaction would violate daily and/or per-transaction spending limits established for the online stored-value account 128, whether the stored-value balance in the account is authorized for the particular goods or services, whether notifications are to be sent to the customer 102 regarding the authorization request and associated payment transaction, and the like.

The routine 400 proceeds from operation 406 to operation 408, where the authorization/payment service 202 determines from the tracking balance 114B and any limits or authorizations retrieved whether to allow or deny the payment transaction. The authorization/payment service 202 then responds to the program manager system 112 with the authorization (or denial) for the transaction. As further described above in regard to FIG. 2, the program manager system 112 then forwards the authorization to the payment network system 108, which forwards it back to the merchant system.

From operation 408, the routine 400 proceeds to operation 410, where the authorization/payment service 202 receives the purchase confirmation associated with the authorized payment transaction. As described above, once the payment transaction is completed, the merchant system may inform the payment network system 108, which forwards the completed transaction to the program manager system 112 and then to the authorization/payment service 202 on the payment services provider system 126. The authorization/payment service 202 may then update the tracking balance 114B associated with the online stored-value account 128 accordingly, as shown at operation 412. From operation 412, the routine 400 ends.

Figure 5:
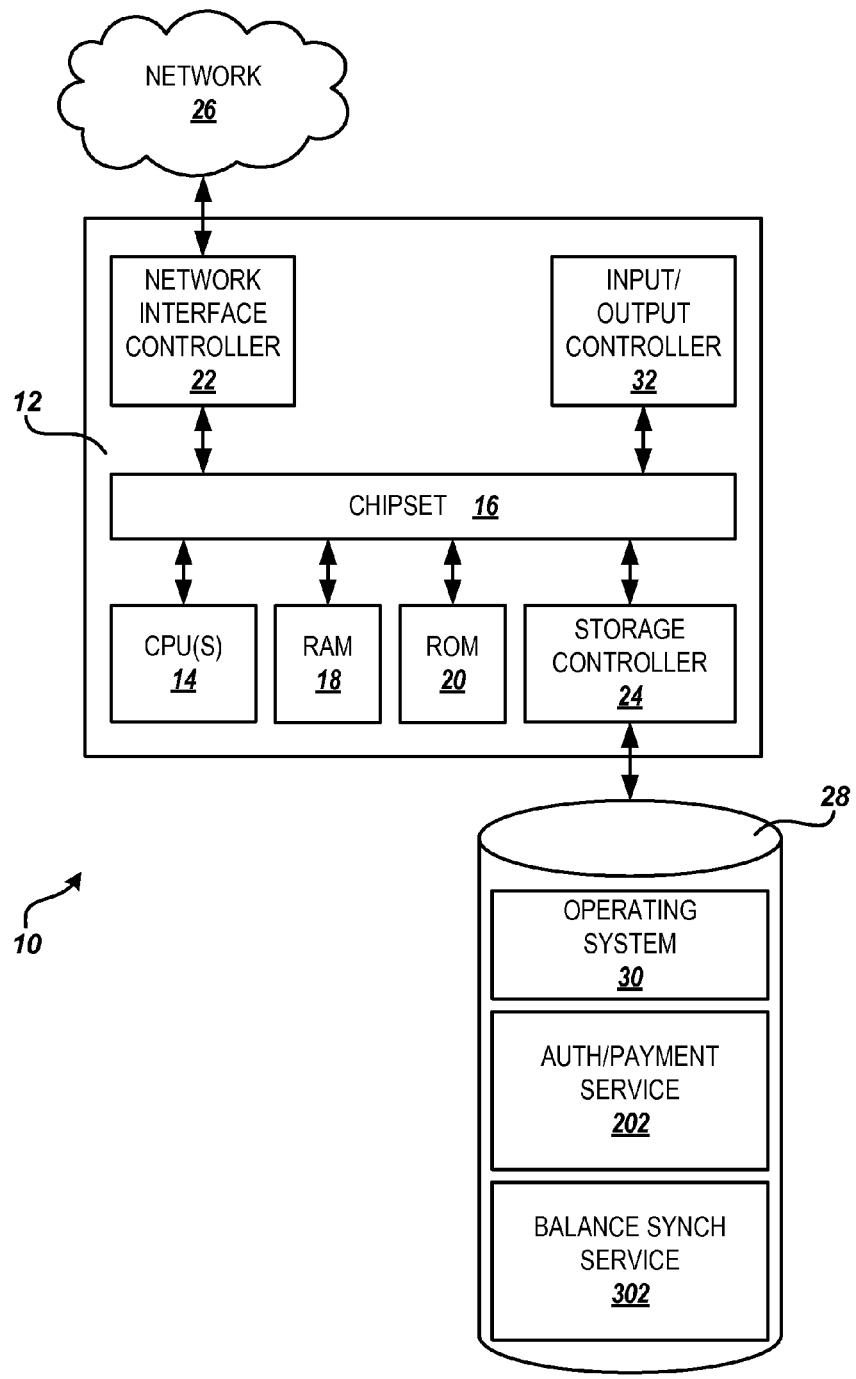
FIG. 5 is a computer architecture diagram showing an illustrative computer hardware architecture for implementing computer software modules and routines described in the embodiments presented herein.

FIG. 5 shows an example computer architecture 10 for a computer 12 capable of executing the software components and routines described herein for making the value in an online-stored value account accessible through a prepaid debit card, in the manner presented above. The computer architecture 10 shown in FIG. 5 illustrates a conventional server computer, workstation, desktop computer, laptop, PDA, electronic book reader, digital wireless phone, network appliance, set-top box, or other computing device, and may be utilized to execute any aspects of the software components presented herein described as executing in the payment services provider system 126, the program manager system 112, the payment network system 108, the POS terminal 106, the computing device 120, or other system or computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through a network 26, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. For example, the NIC 22 may be capable of connecting the computer 12 to other servers or computing devices over the payment processing network 110 or the Internet 122 described above in regard to FIGS. 1A and 1B. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of the physical state may depend on various factors, in different implementations of this description. Examples of such factors may include, but are not limited to, the technology used to implement the physical storage units, whether the mass storage device 28 is characterized as primary or secondary storage, or the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable medium to store and retrieve information, such as program modules, data structures, or other data. It should be appreciated by those skilled in the art that computer-readable media can be any available media that may be accessed by the computer 12, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the authorization/payment service 202 and/or the balance synchronization service 302, each of which was described above in regard to FIGS. 2 and 3. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routine 400 for making the value in an online-stored value account accessible through a prepaid debit card, as described above in regard to FIG. 4.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device, such as a computer monitor, a flat-panel display, a digital projector, a printer, a plotter, or other type of output device. It will be appreciated that the computer 12 may not include all of the components shown in FIG. 5, may include other components that are not explicitly shown in FIG. 5, or may utilize an architecture completely different than that shown in FIG. 5.

Based on the foregoing, it should be appreciated that technologies for making the value in an online-stored value account accessible through a prepaid debit card are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereon that, when executed by a computer, cause the computer to:
    receive an authorization request from a program manager system operated by a program manager, the authorization request related to a use of a co-managed general-purpose reloadable card for a purchase transaction by a customer, wherein the co-managed general-purpose reloadable card is co-managed by the program manager and a payment services provider;
    in response to receiving the authorization request related to the use of the co-managed general-purpose reloadable card, determine a current balance associated with an online stored-value account of the customer maintained by the payment services provider;
    respond to the program manager system with an authorization for the purchase transaction based on the current balance associated with the online stored-value account of the customer;
    receive a purchase confirmation associated with the purchase transaction;
    in response to receiving the purchase confirmation, update the current balance associated with the online stored-value account to reflect the purchase transaction; and
    provide a balance synchronization service configured to keep a balance of funds associated with the co-managed general-purpose reloadable card maintained in the program manager system associated with the co-managed general-purpose reloadable card synchronized with the balance associated with the online stored-value account maintained by the payment services provider.

2. The computer-readable storage medium of claim 1, having further computer-executable instructions stored thereon that cause the computer to:
    upon receiving the authorization request, retrieve any spending limits or authorizations configured for the online stored-value account; and
    respond to the program manager system with an authorization for the purchase transaction based on the current balance and the spending limits or authorizations retrieved.

3. The computer-readable storage medium of claim 1, having further computer-executable instructions stored thereon that cause the computer to:
    subsequent to receiving the purchase confirmation, perform settlement processing regarding the purchase transaction with a bank issuing the co-managed general-purpose reloadable card.

4. The computer-readable storage medium of claim 1, having further computer-executable instructions stored thereon that cause the computer to:
    receive a payment transaction from an e-commerce website for the customer, wherein the e-commerce website is associated with a payment services provider system hosting the online stored-value account; and
    process the payment transaction and update the current balance associated with the online stored-value account to reflect the payment transaction.

5. The computer-readable storage medium of claim 4, wherein the payment services provider system hosts a Web portal allowing the customer to manage the online stored-value account and the co-managed general-purpose reloadable card.

6. The computer-readable storage medium of claim 5, wherein the Web portal further allows the customer to add funds to the current balance associated with the online stored-value account and the co-managed general-purpose reloadable card.

7. The computer-readable storage medium of claim 1, wherein the co-managed general-purpose reloadable card is purchased from a retail outlet by the customer.

8. A computer-implemented method for making funds associated with an online stored-value account accessible through a general-purpose reloadable ("GPR") card, the method comprising executing instructions in a computer system to perform the operations of:
    receiving at a computer system of a payment services provider system hosting the online stored-value account an authorization request from a program manager system associated with the GPR card, the authorization request related to a use of the GPR card for a purchase transaction;
    in response to receiving the authorization request at the computer system, determining a balance of the funds associated with the online stored-value account;
    providing a response from the computer system to the program manager system with an authorization for the purchase transaction based on the balance of the funds;
    receiving a purchase confirmation associated with the purchase transaction at the computer system;
    in response to receiving the purchase confirmation, updating the balance of the funds associated with the online stored-value account by way of the computer system to reflect the purchase transaction; and
    providing a balance synchronization service configured to keep a balance of funds associated with the GPR card maintained in the program manager system associated with the GPR card synchronized with the balance of the funds associated with the online stored-value account maintained by the payment services provider system.

9. The computer-implemented method of claim 8, further comprising:
    upon receiving the authorization request, retrieving any spending limits or authorizations configured for the online stored-value account; and
    responding to the program manager system with an authorization for the purchase transaction based on the balance of the funds and the spending limits or authorizations retrieved.

10. The computer-implemented method of claim 8, wherein the program manager system is configured to perform settlement processing regarding purchase transactions made with the GPR card with a bank issuing the GPR card.

11. The computer-implemented method of claim 8, wherein the program manager system is configured to integrate with a payment network system associated with the GPR card.

12. The computer-implemented method of claim 8, wherein the payment services provider system hosts a Web portal allowing a customer to manage the online stored-value account and the GPR card.

13. The computer-implemented method of claim 12, wherein the Web portal further allows the customer to add to the funds associated with the online stored-value account and the GPR card.

14. The computer-implemented method of claim 8, wherein the GPR card is purchased from a retail outlet by a customer.

15. A system for making funds associated with an online stored-value account accessible through a general-purpose reloadable ("GPR") card, the system comprising:
- a processor; and
- a memory coupled to the processor and having computer-executable instructions stored thereupon that, when executed, cause the processor to
- receive an authorization request from a program manager system operated by a program manager, the authorization request related to a use of a co-managed general-purpose reloadable card for a purchase transaction by a customer, wherein the co-managed general-purpose reloadable card is co-managed by the program manager and a payment services provider,
- in response to receiving the authorization request related to the use of the co-managed general-purpose reloadable card, determine a current balance associated with an online stored-value account of the customer maintained by the payment services provider,
- respond to the program manager system with an authorization for the purchase transaction based on the current balance associated with the online stored-value account of the customer,
- receive a purchase confirmation associated with the purchase transaction,
- in response to receiving the purchase confirmation, update the current balance associated with the online stored-value account to reflect the purchase transaction, and
- provide a balance synchronization service configured to keep a balance of funds associated with the GPR card maintained in the program manager system associated with the GPR card synchronized with the balance associated with the online stored-value account maintained by the payment services provider.

16. The system of claim 15, wherein the program manager system is configured to perform settlement processing regarding purchase transactions made with the GPR card with a bank issuing the GPR card.

17. The system of claim 16, wherein the payment services provider system is configured to perform settlement processing regarding purchase transactions made through the online stored-value account with the bank.

18. The system of claim 15, wherein the program manager system is configured to integrate with a payment network system associated with the GPR card.

19. The system of claim 15, wherein the payment services provider system hosts a Web portal allowing a customer to manage the online stored-value account and to activate the GPR card.

20. The system of claim 15, wherein the GPR card is purchased and initially funded by a customer at a retail outlet.

21. The system of claim 15, wherein the balance synchronization service is configured to synchronize the balance of funds associated with the GPR card with the balance of funds associated with the online stored-value account in response to transaction processing occurring on the program manager system or the payment services provider system.

22. The system of claim 15, wherein the balance synchronization service is configured to synchronize the balance of funds associated with the GPR card with the balance of funds associated with the online stored-value account on a timed basis.

* * * * *